United States Patent [19]

Saito

[11] 4,123,487
[45] Oct. 31, 1978

[54] PROCESS FOR PREPARING A TUBULAR ARTICLE OF THERMOPLASTIC RESIN

[75] Inventor: Shoji Saito, Toyono, Japan

[73] Assignee: Shin'Etsu Kasei Kabushiki Kaisha, Nagano, Japan

[21] Appl. No.: 624,188

[22] Filed: Oct. 20, 1975

Related U.S. Application Data

[63] Continuation of Ser. No. 396,541, Sep. 12, 1973, abandoned.

[30] Foreign Application Priority Data

Sep. 12, 1972 [JP] Japan .................................. 47-92039

[51] Int. Cl.² ............................................. B29D 23/04
[52] U.S. Cl. ........................................ 264/90; 264/95;
264/103; 264/209; 264/237; 425/72 R;
425/326.1
[58] Field of Search ...................... 264/89, 90, 95, 103,
264/209, 237, 290 R; 425/72, 326 R, 378, 326.1

[56] References Cited

U.S. PATENT DOCUMENTS

| 2,708,772 | 5/1955 | Moncrieff | 264/209 |
| 2,987,765 | 6/1961 | Cichelli | 264/95 |
| 3,092,874 | 6/1963 | Fallwell | 425/326 R |
| 3,231,651 | 1/1966 | Cheney | 264/95 |
| 3,284,552 | 11/1966 | Haley | 264/95 |
| 3,306,962 | 2/1967 | Pepper | 264/90 |

Primary Examiner—Jeffery R. Thurlow
Attorney, Agent, or Firm—Armstrong, Nikaido, Marmelstein & Kubovcik

[57] ABSTRACT

A method and apparatus are provided for extruding a tubular article in which a mandrel, over which the article is drawn, has a groove on the outer surface thereof and an aperture in the groove. As the tubular article is drawn over the mandrel and in contact therewith, air between the tubular article and mandrel is forced into the groove and discharged through the aperture.

8 Claims, 5 Drawing Figures

PROCESS FOR PREPARING A TUBULAR ARTICLE OF THERMOPLASTIC RESIN

This is a continuation, of application Ser. No. 396,541 filed Sept. 12, 1973, now abandoned.

BACKGROUND OF THE INVENTION

This invention relates to an improvement of a process and apparatus for preparing a tubular article wherein a mandrel is used in extruding the tubular article from thermoplastic resin, and the form of the tubular article is adjusted by means of the mandrel.

It is already known that a tubular article can be prepared from thermoplastic resin by an extrusion process, wherein a die is mounted on the forward end of an extruder, said die being provided with an annular orifice, from which heated thermoplastic resin is extruded in the form of a tube. It is also known that the tubular article can be completed to a desired shape by what is called a mandrel process, wherein a rigid member which is called a mandrel is mounted on the forward end of the inner core of said die, said mandrel having an outer sectional shape corresponding to an inner shape of the article to be obtained the resin tube extruded from the die is advanced along outer surface of said mandrel. Further, it is also known that an extrusion efficiency can be increased by adopting the process, wherein cooling liquid is circulated in said mandrel so that the inner surface of the tubular article is cooled.

The inventor attempted to prepare a tube of polyethylene by using a mandrel according to the above known processes. Further, on carrying out the processes, the inventor attempted to enhance the extrusion efficiency by cooling the mandrel in order to rapidly cool the extruded polyethylene tube from its inner surface while advancing along the outer surface of the mandrel. The polyethylene tube could formed in the shaped just corresponding to the mandrel, however, the tube was not of good quality because the tube had rough portions on the surface. The rough portions are as shown in FIG. 1 the protuberances were scattered over the surface of the tube as if each of the protuberances were in the shape of a bowl turned upside down. The tube was therefore of remarkably less commercial value.

The inventor has prepared a die for use in preparing a resin tube, on inner core of which is mounted a mandrel, which has a groove and an aperture, said groove being located on the outer surface of the mandrel in the form of a ring surrounding the mandrel, said aperture being located in the groove and communicating with outside of the die through a pipe extending through the die. The die may be used in such a manner that the extruded resin tube is advanced in contact with the outer surface of the mandrel. This is done by discharging from the aperture the air contained between the mandrel and the resin tube.

The inventor has carried out the extrusion process by mounting the die on an extruder and by discharging the air to the exterior of the mandrel. This effects a close contact between the extruded polyethylene tube and the outer surface of a mandrel, and as the result the inventor has succeeded in solving the above drawbacks. In the conventional mandrel processes, attempts have been made to introduce the air into a gap between the mandrel and the extruded tube in order to avoid direct contact of the extruded tube with the mandrel so that the surface of the extruded tube may not be damaged by the mandrel. This, technique is opposite to the technique of the present invention. It is quite surprising to find that above attempt solves the drawbacks and thereby a polyethylene tube having an excellent quality can be obtained.

SUMMARY OF THE INVENTION

According to the present invention, an improved process and apparatus for preparing a tubular article of thermoplastic resin are provided which is characterized by taking a conventional process of mounting a die having an annular orifice on the forward end of an extruder, further mounting a mandrel having a desired outer cross-sectional shape on the forward end of the inner core of said die, extruding from said orifice a tube of thermoplastic resin, advancing the tube along the outer surface of said mandrel by pulling out the tube by means of take-up rolls, and cooling said mandrel and adding the an improvement which comprises locating the mandrel away from the forward end of the inner core, providing the mandrel with a groove in the form of a ring on the outer surface of the mandrel in the vicinity where the tube begins to contact with the outer surface of the mandrel, perforating at least one aperture in the groove, and discharging the air contained between the mandrel and the tube through the interior of the die from the aperture so that the tube contacts the mandrel.

The present invention also includes a process for preparing a tubular article of thermoplastic resin as stated above, wherein the extruded tube is rotated or turned around its axis by rotating at least a member selected from the group consisting of the die with mandrel and take-up rolls.

Generally in the conventional process, a die has been immovable fixed to an extruder, and take-up rolls have not been rotated about the axis of the extruded tube. Consequently a resin tube extruded from the die has only been pulled out straight without being rotated around its axis. In short, the tube has never been rotated around its axis while being extruded from the die. Thus, the tube prepared by the conventional process has retained various uneven portions in the form of straight and latent lines. Said uneven portions were generated in the resin while the resin passes in the die, for example, when the resin was welded after being passed through bridges positioned between the inner core and outer barrel of the die. The inventor contemplated that existence of the uneven portions in the form of straight lines caused deterioration in the quality of the resin tube. Thus, the inventor attempted to improve the quality of the resin tube by rotating the tube at a position wherein take-up rolls are provided while the tube is being extruded from the die.

When a resin tube is rotated around its axis by rotating only take-up rolls in the conventional processes, the tube is twisted in the soft portion just extruded and deformed so that a satisfactory tube could not be obtained. It has been found, however, when the mandrel is mounted on the inner core of the die as in the present invention, no deformation occurs and a resin tube of superior quality is obtained.

According to the present invention, an improved process and apparatus for preparing a tubular article of thermoplastic resin is also provided which is characterized by taking a conventional process of mounting a die having an annular orifice on the forward end of an extruder, further mounting a mandrel having a desired outer cross-sectional shape on the forward end of the inner core of said die, extruding from said orifice a tube of thermoplastic resin, advancing the tube along the outer surface of said mandrel by pulling out the tube by means of take-up rolls, and cooling said mandrel and providing an improvement which comprises locating the mandrel away from the forward end of the inner core, giving the mandrel a cylindrical shape which is slightly tapered to the end, providing the mandrel with a groove in the form of a ring on the outer surface of the mandrel in the vicinity where the tube begins to contact the outer surface of the mandrel, perforating at least one aperture in the groove, discharging the air contained between the mandrel and the tube through interior of the die from the aperture so that the tube contacts the mandrel, and rotating a member selected from the group consisting of the die with the mandrel and the take-up rolls, and thus turning the tube while the tube is being extruded.

BRIEF DESCRIPTION OF THE DRAWINGS

By way of an example, the present invention is illustrated by the drawings, in which.

DESCRIPTION OF THE PREFERRED EMBODIMENTS

Figure 2:
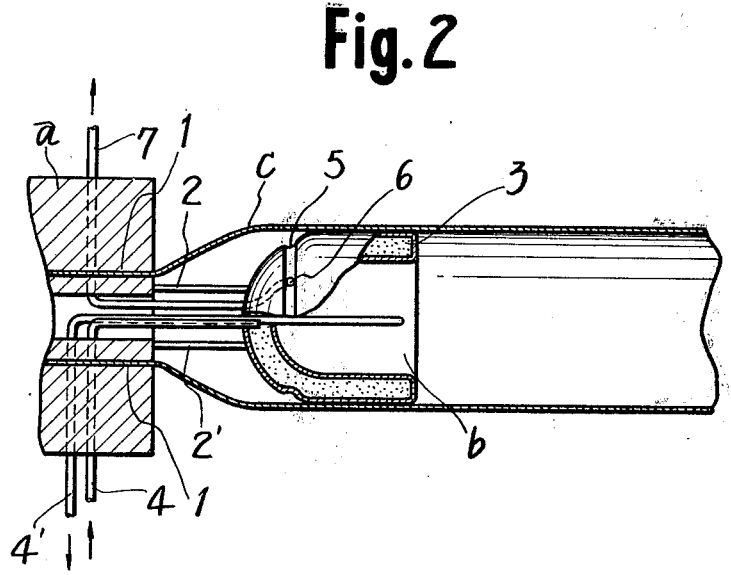
FIG. 2 is a side view, partly cut away, of an embodiment of this invention.

Referring at first to the drawings, an example of apparatus which is used in this invention is explained as follows: In FIG. 2, $a$ denotes a die mounted on the forward end of an extruder, $b$ denotes a mandrel mounted on the forward end of the inner core of die $a$, and $c$ is an extruded tube. Die $a$ is provided with resin passage 1, through which heated resin is extruded in the form of tube $c$. Mandrel $b$ is an iron cylinder, the wall of which is made hollow, the mandrel $b$ is fixed to the inner core of die $a$ by means of supports 2 and 2'. Mandrel $b$ is filled with water 3, which is circulated through pipes 4 and 4' in the directions indicated by the arrows. The outer surface of mandrel $b$ is provided with groove 5, which has an aperture 6. Aperture 6 communicates with the outside of die $a$ through pipe 7. Groove 5 is provided on the outer surface of mandrel $b$ the point where mandrel $b$ has its maximum outer diameter.

The process of this invention is carried out by means of the apparatus shown in FIG. 2 in the following manner: Cooling water is circulated in mandrel $b$ through pipes 4 and 4', and heated resin is fed to passage 1 in die $a$, through which tube $c$ is extruded. Then, tube $c$ is advanced along the outer surface of mandrel $b$, while cooling water 3 is circulated in mandrel $b$ and the air is discharged from pipe 7 which communicates with aperture 6. Thus, tube $c$ is advanced in contact with mandrel $b$ from the vicinity of the groove 5. As the result, the tube is rapidly cooled by mandrel $b$, and is provided with an inner hole having the same cross-sectional dimensions as those of the outer surface of mandrel $b$.

Figure 1:
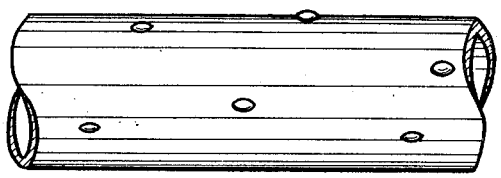
FIG. 1 is a sketch of the tube obtained by the conventional process.

According to this invention, since the mandrel is provided with a groove on its outer surface and at least one aperture is provided in the groove, the air is discharged from the aperture, and the tube is advanced in contact with the entire circular surface of the mandrel from the vicinity of the groove. Because the tube is in contact with the surface of the mandrel fluid does not condense at places between the tube and mandrel. Consequently rough areas as shown in FIG. 1 are prevented from occurring in the tube. The particular reasons why rough areas occur in the conventional processes is not clear, but it appears to be caused by condensation of fluid such as steam or moisture in places between the tube and the mandrel. As a matter of course, general effect which can be accomplished by using a mandrel in the conventional extrusion process may also be attained in the invented process. That is, extrusion velocity may be increased, because the extruded tube can be cooled rapidly by means of cooling of the mandrel, and a shaped article can be obtained in the form corresponding to the shape of the mandrel.

The mandrel used in this invention may have a smooth and lustrous surface such as nickel-plated surface or a rough surface such as pearskin. The groove provided on the mandrel is sufficient even if it is narrow in width and shallow in depth. Preferable the dimensions of the groove are varied according to the dimensions of the mandrel, however, if the mandrel has the diameter of 50 mm, then preferable the dimensions of the groove are about 10 mm in width and 8 mm in depth. In general, it is preferable that the diameter of the aperture in the groove be somewhat less than the width of the groove, however, there is no clear limitations in the diameter of the aperture. In the event too much air is discharged through the aperture, the tube is so strongly attracted to the mandrel that the it can hardly be advanced. Therefore, it is necessary that the air be adjusted so that a moderate amount of the air may be discharged through the aperture. In some cases, a good result is brought about, if the mandrel is tapered to its end in the advancing direction of the tube, since the resin tube can easily slide upon the mandrel, although the resin tube shrinks gradually as cooled on the mandrel.

Figure 3:
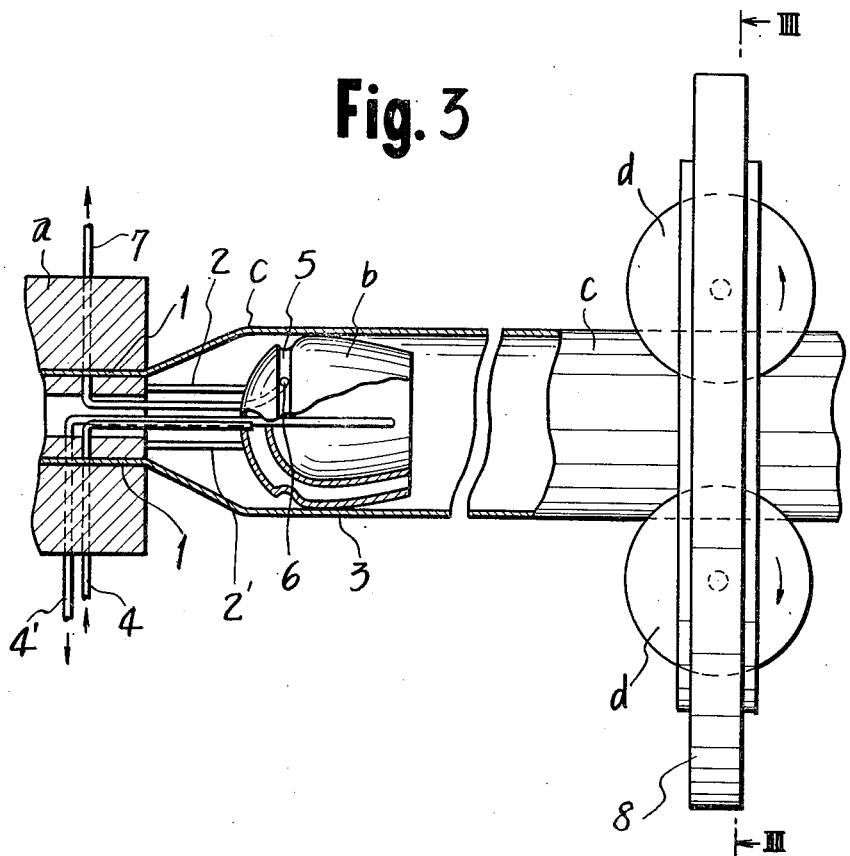
FIG. 3 is a side view, partly cut away, of another embodiment of this invention, in which take-up rolls are rotated.
Figure 4:
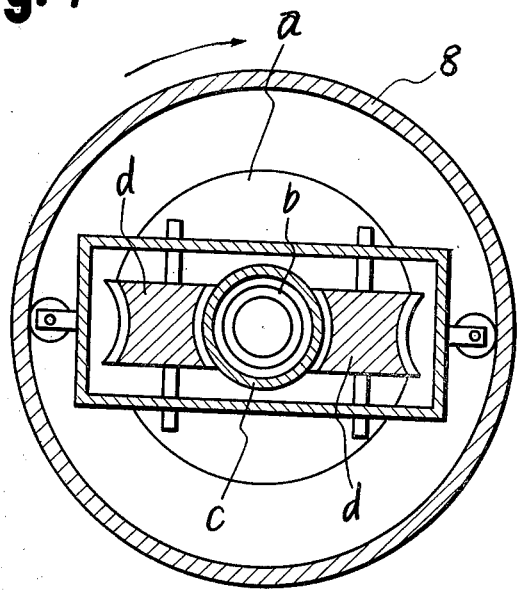
FIG. 4 is a cross-sectional view cut along line III-III line in FIG. 3.

Referring now to FIG. 3, $a$ is a die mounted on the forward end of an extruder, $b$ is a mandrel mounted on the forward end of the inner mold of die $a$, $c$ is an extruded tube, and $d$ are take-up rolls. Die $a$ is provided with annular orifice 1, and heated resin is extruded from orifice 1 and forms tube $c$. The mandrel $b$ is fixed to the inner core of die $a$ by supports 2 and 2'. Water 3 is circulated in mandrel $b$. Pipes 4 and 4' are for circulating water 3 in mandrel $b$. Mandrel $b$ has a cylindrical outer surface which is slightly tapered to the end, though the taper is exaggerated in FIG. 3. Mandrel $b$ is provided with groove 5 on its outer surface. Groove 5 has an aperture 6 which communicates with the outside of the die $a$ through pipe 7. Groove 5 is provided on the outer surface of mandrel $b$ in the vicinity of the point where mandrel $b$ has its maximum outer diameter. Rolls $d$ are for pulling out tube $c$ and are rotated in the direction indicated by arrows in FIG. 3. Further, entire rolls $d$ are rotated about the axis of tube $c$ within a plane perpendicular to said axis along frame 8, as shown in FIG. 4.

Mandrel $b$ used in FIG. 3 is identical with mandrel $b$ used in FIG. 2, except that mandrel $b$ in FIG. 3 is slightly tapered to the end. Therefore, explanation made as to mandrel b referring to FIG. 2 can also applied to mandrel b of FIG. 3.

In the example shown in FIG. 3, a resin tube is prepared in the following manner: Cooling water 3 is at first circulated in mandrel b through pipes 4 and 4′, and heated resin is fed to passage 1 and extruded from die a in the form of tube c. Extruded tube c is advanced along the outer surface of mandrel b. The outer surface of mandrel b is cooled by circulated water 3, and the air is discharged from pipe 7 communicating with aperture 6, and therefore tube c is attracted to the outer surface of the mandrel, and is advanced in contact with the outer circular surface of mandrel b from the vicinity of the groove 5. Thus, tube c is cooled from its inside and its inner shape is adjusted by the outer surface of mandrel b. In the course of advancing along mandrel b, since mandrel b is slightly tapered to the end, tube c is at first contacted closely with mandrel b in the vicinity of groove 5, however, thereafter tube c is not as closely in contact with mandrel than in the vicinity of groove 5. At this time, the tube c is in a nearly hardened state. Therefore, when take-up rolls d are rotated in the direction of the arrow of FIG. 3 to advance tube c, and at the same time, take-up rolls d are gently rotated around the axis of tube c within a plane perpendicular to the axis of tube c, as shown in FIG. 4, the tube is twisted in a spiral in the area between die a and mandrel b. At this time, since mandrel b is interposed in tube c, if take-up rolls d are rotated about the axis of tube c at low speed in relation to rotating speed for advancing tube c, is not deformed to such an extent that tube c gets out of the desired shape. In fact, tube c is somewhat obliquely stretched, but the tube does not show any apparent change. Thus, a tube is obtained which is circumferentially twisted and has the desired cross section determined by mandrel b. In general, the obtained tube is not different from the tube prepared by the conventional processes, unless take-up rolls d are rotated at too great a speed in the direction within a plane perpendicular to the axis of the tube.

According to the invention, since a groove is provided on the outer surface of the mandrel and at least one aperture is provided in the groove so that the air is circumferentially and uniformly discharged from the aperture, when the extruded tube is advanced along outer surface of the mandrel, the tube contact circumferentially the outer surface of the mandrel in the vicinity of the groove. Hence, the hole of the tube is accurately sized by the mandrel, and the tube has an uniform cross-sectional hole. The tube never gives rise to any deformation or gets out of the desired shape because of the contact of the tube with the mandrel, although the tube is pulled and twisted by rolls d. Further, the tube is somewhat obliquely stretched as the result of being twisted between the mandrel and the take-up rolls.

According to the present invention, a resin tube is obtained which has an appearance identical with that of a conventional tube prepared by the conventional processes. However, the tube prepared by this invention is superior to the conventional tube in various properties, because the tube in this invention is twisted in the spiral direction between the die and the mandrel so that the tube is stretched in the circumferential direction as well as in the longitudinal direction. That is, the resin molecules are oriented in the spiral direction so that the tube will be strengthened not only in the longitudinal direction but also in the circumferential direction. The tube is also decreased in warping in the longitudinal direction.

Further, the tube is increased in mechanical strength in the radial and circumferential directions. These improvements in various properties are more remarkable when the tube has a large thickness and is made of a resin of a kind having a large degree of crystallization.

Figure 5:
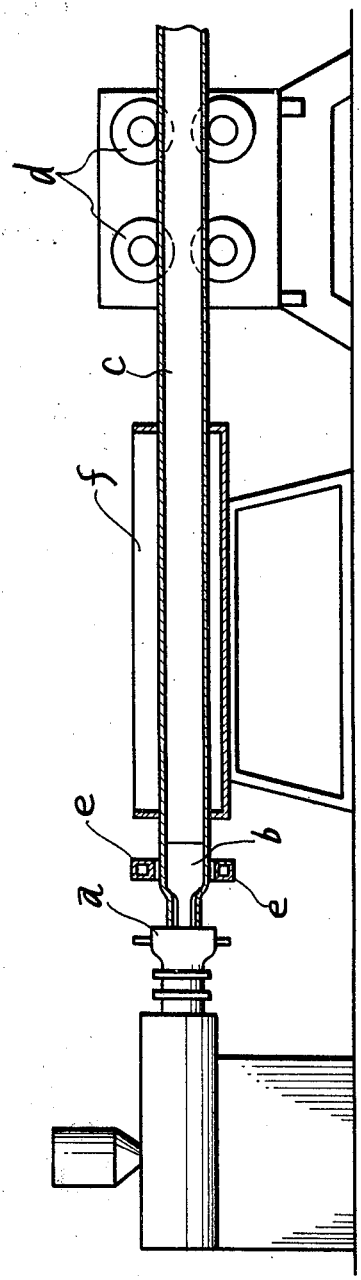
FIG. 5 is a schematical view, partly cut away, of an embodiment of this invention including a means for cooling the resin tube.

Incidentally, in order to cool the extruded resin tube, it is preferable to use both the air and water. In particular, it is preferable to cool the resin tube at first by the air, followed by water. For example, as shown in FIG. 5, cooling of the tube may be carried out by providing ring e around the mandrel is located, blowing the air from said ring onto the resin tube, and then passing the tube through a water tank f. In this case, the resin tube is cooled at its outer surface by the air from ring e. This cooling with air corresponds to cooling for the inner surface of the tube by the mandrel, and acts as the first cooling for the outer surface of the tube. After the air cooling, the tube is further cooled by water contained in the water tank located between the mandrel and the take-up rolls.

The following examples will serve to illustrate the present invention.

EXAMPLE 1

A tube having an outer diameter of 60 mm and a thickness of 5 mm was prepared from low density polyethylene by means of an extruder having the inside diameter of 50 mm.

An apparatus used herein was shown in FIG. 2. Referring to FIG. 2, particulars of the apparatus is as follows: Die a is provided with passage 1, which has the width of 8 mm and the inner diameter of 40 mm at the forward end of the die. Mandrel b is fixed to the forward end of the inner core of die a by supports 2 and 2′. Mandrel b is an iron cylinder, the wall of which is hollow, and outer surface of which is nickel-plated. The mandrel has the outside diameter of 50 mm, and is not tapered to the end. Water 3 is circulated in the mandrel as seen in FIG. 2. Groove 5 is provided on the mandrel at a place 30 mm away from die a, and the groove is 10 mm in width and 8 mm in depth. Aperture 6 of about 10 mm in diameter is provided in groove 5, and communicates with outside of die a through pipe 7.

By means of the above described apparatus, extrusion was carried out while cooling water was circulated in the mandrel b, and the air was discharged through pipe 7. As the result, a tube was obtained which had a desired shape and flat, smooth surface.

For comparison, the same process was tried without discharging the air through pipe 7. This process corresponds, of course, to the known prior art process. By this prior art process a tube was obtained which had uneven portions on the surface as shown in FIG. 1.

EXAMPLE 2

By means of an extruder having the inner diameter of 120 mm, a tube having the outer diameter of 420 mm and the thickness of 10 mm was extruded from a material, which is prepared by mixing 2 percent by weight of carbon black with high density polyethylene (Hizex 6131M). In said extrusion, take-up rolls were rotated around the axis of the extruded tube, and therefore the tube was obtained which was slightly twisted in the process of the extrusion.

An apparatus used in this example was as shown in FIGS. 3 and 4. In particular, referring to FIG. 3, passage 1 has the width of 13 mm and the inner diameter of 370 mm at the forward end of die a. Mandrel b is an iron cylinder which is mounted on a position 100 mm away from die a. Mandrel b is tapered to the end, and has the maximum outer diameter of 427 mm, an outer diameter of 410 mm at the forward end, and the length of about 1000 mm. Two grooves are provided on the outer surface of mandrel b at positions 25 mm and 100 mm away, respectively, from the rear end of the mandrel, each of said grooves being 5 mm in width and 3 mm in depth. Aperture 6 having the diameter of 5 mm is provided in the groove. The aperture communicates with pipe 7, which further with a communicate space of reduced pressure of 500 mm Hg, and thus the air is discharged. Water at 15° C is circulated in the mandrel in order to cool the mandrel.

The rolls d pulled out the tube at the rate of 40 cm per minute, and entire paired rolls d are rotated around the axis of the tube at the rate of 3 r.p.m. within frame 8. Thus, a polyethylene tube was obtained which has the thickness of 10 mm and the inner diameter of 400 mm. The tube had smooth surfaces on both inside and outside, and was beautiful in appearance and superior in mechanical properties.

I claim:

1. In a process for preparing a tubular article of thermoplastic resin which comprises mounting a die having an annular orifice on the forward end of an extruder, further mounting a mandrel having a desired outer cross-sectional shape on the forward end of the inner core of said die, extruding from said orifice a tube of thermoplastic resin, advancing the tube along the outer surface of said mandrel by pulling out the tube by means of take-up rolls, and cooling said mandrel; an improvement which comprises positioning the mandrel away from the forward end of the inner core, providing the mandrel with a groove in the form of a ring on the outer surface of the mandrel in the vicinity of where the tube begins to contact with the outer surface of the mandrel, forming at least one aperture in the groove, and withdrawing the air in the space between the mandrel and the tube through the aperture and through the interior of the die by reducing the pressure in the space between the mandrel, the die face and the tube wherein the tube contacts the mandrel due to the removal of the air.

2. In a process for preparing a tubular article of thermoplastic resin which comprises mounting a die having an annular orifice on the forward end of an extruder, further mounting a mandrel having a desired outer cross-sectional shape on the forward end of the inner core of said die, extruding from said orifice a tube of thermoplastic resin, advancing the tube along the outer surface of said mandrel by pulling out the tube by means of take-up rolls, and cooling said mandrel; an improvement which comprises positioning the mandrel away from the forward end of the inner core, forming the mandrel with a cylindrical shape which is slightly tapered toward the rear end, providing the mandrel with a groove in the form of a ring on the outer surface of the mandrel in the vicinity of where the tube begins to contact with the outer surface of the mandrel, forming at least one aperture in the groove, withdrawing the air in the space between the mandrel and the tube through the aperture and through the interior of the die by reducing the pressure in the space between the mandrel, the die face and the tube such that the tube contacts the mandrel, and twisting the tube about its axis while the tube is being extruded by rotating at least one of said die, mandrel or take-up rolls.

3. In an apparatus for forming a tubular article of thermoplastic resin comprising a die having an annular orifice on the forward end of an extuder, a mandrel positioned on the forward end of the inner core of said die, and take-up rolls wherein said tubular article is extruded from said orifice and drawn along the outer surface of said mandrel by said take-up rolls the improvement comprising:

evacuation means for withdrawing the air from the space between the mandrel, the die and the tubular article, said evacuation means comprising:
(a) a groove means formed on the outer surface of said mandrel in the vicinity of where the tube begins to contact the outer surface of the mandrel;
(b) pressure reducing means for reducing the pressure on the exterior of the die to a pressure below the pressure in the space between the mandrel and the tubular article;
(c) at least one aperture means in said groove means; and
(d) connection means connecting said at least one aperture means in said groove means, and said pressure reducing means, said at least one aperture means and connection means providing a discharge path for air between the mandrel, the die and the tubular article wherein when said tubular article contacts said mandrel and the air therebetween is forced into said groove means and then into said aperture means such that it is discharged therefrom; whereby said tubular article closely contacts the surface of said mandrel, thus forming a smooth surface on said tubular article.

4. The apparatus of claim 3, wherein said groove means is a ring around said mandrel.

5. The apparatus of claim 4, wherein said mandrel is slightly tapered toward its rear end.

6. The apparatus of claim 5, further including means for rotating said take-up rolls about the axis of said die and mandrel and perpendicular thereto, whereby a twist is imparted to said tubular article as it is being extruded.

7. The apparatus of claim 6, further including cooling means for cooling the outer surface of said tubular article after it has contacted said mandrel.

8. The apparatus of claim 7, wherein said cooling means comprises air cooling means.

* * * * *